UNITED STATES PATENT OFFICE.

FRANZ MUHLERT, OF PELE TYROLKA, NEAR PRAGUE, ASSIGNOR TO KINZLEBERGER & CO., OF PRAGUE, AUSTRIA-HUNGARY.

MANUFACTURE OF YELLOW AND ORANGE DYE.

SPECIFICATION forming part of Letters Patent No. 528,965, dated November 13, 1894.

Application filed April 17, 1894. Serial No. 507,884. (Specimens.)

*To all whom it may concern:*

Be it known that I, FRANZ MUHLERT, doctor of philosophy, a subject of the Emperor of Germany, residing at Pele Tyrolka, near Prague, in the Province of Bohemia, in the Empire of Austria-Hungary, have invented certain new and useful Improvements in the Manufacture of Yellow and Orange Coloring-Matters from Beta-Resorcylic Acid; and I do hereby declare the following to be a full, clear, and exact description of the invention, such as will enable others skilled in the art to which it appertains to make and use the same.

The azo dye stuffs obtained by the action of diazotized meta and para nitranilin upon beta-resorcylic acid (COOH:OH:OH=1:2:4) in an acid solution are distinguishable from the corresponding dye stuffs obtained from salicylic acid by their great purity and brightness or intensity of chroma or hue, as well as by their greater tinctorial power which is about twice as great as that of the dye stuffs obtained from salicylic acid. These new dye stuffs readily dye fiber in a mordant of a salt of a metal, and when chromated wool or cotton is dyed therewith, the color is very lasting, is not readily altered or removed by washing, and is not readily affected by light.

In carrying out my invention I proceed as follows: 13.8 kilos of meta-nitranilin are diazotized in a well known manner, and to this diazo solution I add a solution of 15.4 kilos beta-resorcylic acid and 13.6 kilos acetate of sodium in one hundred liters of water. The combination and reaction take place gradually, the dye stuff being precipitated in the form of a yellow flocculent deposit which when dried forms an amorphous powder. It dyes chromated wool or cotton, or wool mordanted with alum or tartar a pure yellow color.

Instead of meta-nitranilin para-nitranilin can be used, the azo-dye stuff obtained dyeing wool and cotton orange yellow.

The reaction in either case takes place according to the following equation:

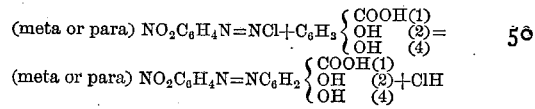

Both the meta and para dyes are amorphous bodies, insoluble in water, soluble in a soda lye and in concentrated sulfuric acid, separating from the latter solution, when water is added thereto, in the form of yellow and orange yellow flocculent bodies respectively, while the sodium salts of both dyes are fine crystalline bodies, soluble in water.

The solutions of the meta dyes are all yellow. Those of the para dyes are generally orange yellow except the solution in concentrated sulfuric acid, which is yellow, while the solution in a soda lye containing an excess of soda is violet blue, the sodium salt of said para dye being of a brown red color.

Having thus described my invention, what I claim as new therein, and desire to secure by Letters Patent, is—

1. The process of obtaining yellow to orange yellow dyes, which consists in causing a diazotized nitraniline as meta or para nitraniline to react upon a resorcylic acid, as beta-resorcylic acid, and separating the dye.

2. The herein-described yellow to orange yellow dyes, distinguished from like dyes derived from salicylic acid by their greater tinctorial power and by their purity and brilliancy of color, and consisting of amorphous bodies insoluble in water, except the alkali salts thereof, soluble in soda lye, in alcohol, and in concentrated sulfuric acid, and separating from the latter, under addition of water, in the form of flocculent bodies.

In testimony whereof I affix my signature in presence of two witnesses.

FRANZ MUHLERT.

Witnesses:
B. BÖHM,
RICHARD KOREFF.

Corrections in Letters Patent No. 528,965.

It is hereby certified that the residence of the patentee in Letters Patent No. 528,965, granted November 13, 1894, upon the application of Franz Muhlert, for an improvement in the "Manufacture of Yellow and Orange Dyes," was erroneously written and printed "Pele Tyrolka," whereas said residence should have been written and printed *Pelc Tyrolka*, and the name of the assignee was written and printed "Kinzleberger & Co., whereas it should have been written and printed *Kinzlberger & Co.*; and that the said Letters Patent should be read with these corrections therein that the same may conform to the record of the case in the Patent Office.

Signed, countersigned, and sealed this 1st day of January, A. D. 1895.

[SEAL.]

JNO. M. REYNOLDS,
*Assistant Secretary of the Interior.*

Countersigned:
    JOHN S. SEYMOUR,
        *Commissioner of Patents.*